July 14, 1931.  J. H. MÜLLER  1,814,951
ATTACHMENT FOR DOUGHNUT BLANK CUTTING MACHINES
Filed April 3, 1930
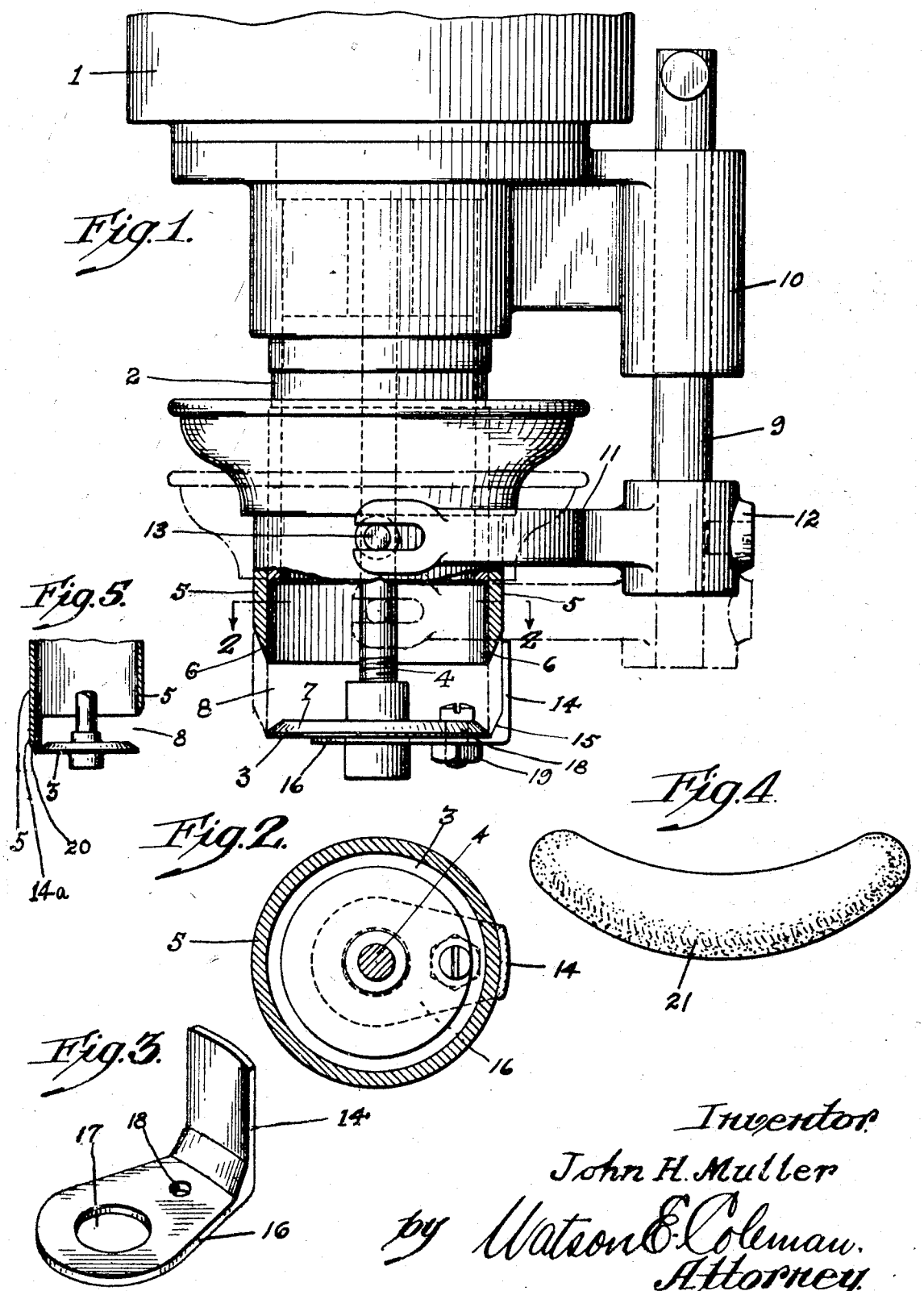

Patented July 14, 1931

1,814,951

UNITED STATES PATENT OFFICE

JOHN H. MÜLLER, OF PHILADELPHIA, PENNSYLVANIA, ASSIGNOR TO JOHN BAUMANN

ATTACHMENT FOR DOUGHNUT BLANK CUTTING MACHINES

Application filed April 3, 1930. Serial No. 441,342.

This invention relates to doughnut blank cutting machines, and has for one of its objects to provide novel and simple means through the medium of which machines for cutting annular doughnut blanks may be readily adapted for cutting doughnut blanks of such formation that they will, while being cooked, assume the form of a crescent.

To attain the foregoing and other objects, the nature of which will appear as the description proceeds, the invention comprehends the provision of a member adapted to extend across the annular discharge opening of a machine of the character stated and adapted to be carried by either the spreader disc or annular knife of the machine, the member being adapted to divide the doughnut blank as it is cut and passes through the discharge opening so that it will assume a crescent formation while being cooked.

The invention is hereinafter fully described and claimed, and illustrated in the accompanying drawings, wherein:

Figure 1 is a view partly in side elevation and partly in vertical section of a doughnut blank cutting machine equipped with a blank divider constructed in accordance with my invention;

Figure 2 is a sectional view taken on the horizontal plane indicated by the line 2—2 of Figure 1;

Figure 3 is a perspective view of the blank divider;

Figure 4 is a view of the doughnut, and

Figure 5 is a view partly in side elevation and partly in elevation illustrating the application of the slightly modified form of the blank divider, the parts shown being on a reduced scale.

The invention is shown applied to a doughnut blank cutting machine of well known construction and including a hopper 1, a dough extruding tube 2 communicating with and extending downwardly from the hopper, a dough spreading disc 3 supported horizontally in spaced relation to the lower end of the tube by a rod 4, and an annular knife 5 surrounding and slidably mounted upon the tube.

The knife 5, when in raised position, has its lower beveled end 6 spaced upwardly from the beveled edge 7 of the disc 3 to provide an annular dough discharging opening 8. As the knife moves downwardly, it severs the dough extruding through the opening 8 and when it is in its lowermost position, it surrounds the disc 3. The knife 5 is operated through the medium of a rod 9 slidably mounted in a bearing 10, and it is connected to the rod through the medium of a yoke 11 which is secured, as at 12, to the rod and is connected, as at 13, to the knife.

The machine, as thus far described, is designed to cut doughnut blanks of annular formation. In order to adapt it to cut blanks which when cooked will form doughnuts of crescent formation, it is in accordance with my invention, provided with a blank divider 14 which extends across its discharge opening 8. The blank divider 14 is carried by the disc 3, and extends upwardly from the lower side of the disc to a point above the cutting edge of the knife 5 when the knife is in its highest position. The blank divider 14 is of arcuate formation in horizontal section to conform to the contour of the outer surface of the knife 5, which surface rides against the inner side of the blank divider during the operation of the knife.

The lower portion of the concave inner side of the blank divider 14 inclines downwardly and inwardly, as shown at 15, to receive the bevelled cutting edge 6 of the knife 5 when the latter is in its lowest position.

The blank divider 14 is secured to the disc 3 through the medium of a bracket arm 16 which contacts with the under side of the disc. The bracket arm 16 is provided near its free end with an opening 17 for the reception of the lower end of the hub of the disc 3, and is provided near its attached end with an opening 18 for the reception of a securing bolt 19. The blank divider 14 and its attaching or bracket arms 16 are formed integrally. The blank divider 14 may be readily secured to a doughnut blank cutting machine, and to adapt the machine for the application thereto of the divider, it is only necessary to provide the disc 3 with an opening for the reception of the bolt 19.

The blank divider may be carried by the knife 5 and if desired, it may be formed integrally therewith, as shown in Figure 5. In this form of the invention, the blank divider is designated 14ª, and it is formed integrally with and extends downwardly from the lower edge of the knife 5. The blank cutter 14ª is of arcuate formation in horizontal section, and its curvature is similar to that of the knife 5. The blank divider 14ª is provided with a lower beveled cutting edge 20.

It should be apparent from the foregoing description, taken in connection with the accompanying drawings, that the member 14 will, since it extends across the discharge opening 8 of the machine, divide the blank as the latter is cut and passes through the discharge opening, and that the divided blank will when cooked, provide a doughnut of crescent formation. The doughnut is shown in Figure 4 and designated 21.

While I have described the principle of the invention, together with the structures which I now consider the preferred embodiments thereof, it is to be understood that the structures shown are merely illustrative and that such changes may be made, when desired, as fall within the scope of the invention as claimed.

I claim:—

1. In a doughnut blank cutting machine, a dough extruding tube having an annular discharge opening, an annular knife slidable across said opening to cut the dough extruded therethrough, and a member wholly arranged outwardly of the tube and extending across said opening to divide the dough as it is extruded through said opening.

2. In a doughnut blank cutting machine, a dough extruding tube, a disc arranged in spaced relation to the lower end of the tube to provide an annular discharge opening, an annular knife slidable across said opening to cut the dough extruded therethrough, and a member wholly arranged outwardly of the tube and extending across said opening from the disc to the knife and carried by one of said parts, said member being adapted to divide the dough as it is extruded through said opening.

3. In a doughnut blank cutting machine, a dough extruding tube, a disc arranged in spaced relation to the lower end of the tube to provide an annular discharge opening, an annular knife slidable across said opening to cut the dough extruded therethrough, and a member extending across said opening from the disc to the knife and carried by one of said parts, and provided with an arcuate inner side contacting with the other, said member being adapted to divide the dough as it extrudes through the opening.

4. In a doughnut blank cutting machine, a dough extruding tube, a disc arranged in spaced relation to the lower end of the tube to provide an annular discharge opening, an annular knife slidable across said opening to cut the dough extruded therethrough, and a member extending across said opening from the knife to the disc and carried by the former and having a concave inner side contacting with the latter, the member being adapted to divide the dough as it is extruded through the opening.

5. In a doughnut blank cutting machine, a dough extruding tube, a disc arranged in spaced relation to the lower end of the tube to provide an annular discharge opening, an annular knife slidable across said opening to cut the dough extruded therethrough, and a member extending across said opening from the disc to the knife and carried by the former and having an arcuate inner side contacting with the latter, the member being adapted to divide the dough as it is extruded through the opening.

6. In a doughnut blank cutting machine, a dough extruding tube, a rod extending axially through and below the lower end of the tube, a disc having a hub and secured to the lower end of the rod in spaced relation to the corresponding end of the tube to provide an annular discharge opening, an annular knife slidable across said opening to cut the dough extruded therethrough, a bracket arm positioned against the disc and provided with an opening for the reception of the hub, an element engaging the disc and arm to secure the latter in place, and a member of arcuate formation in cross section and extending upwardly from the arm to the knife and adapted to divide the dough as it is extruded through said opening.

7. In a doughnut blank cutting machine, a dough extruding tube, a rod extending axially through and below the lower end of the tube, a disc having a hub and secured to the lower end of the rod in spaced relation to the corresponding end of the tube to provide an annular discharge opening, an annular knife slidable across said opening to cut the dough extruded therethrough, a bracket arm positioned against the disc and provided with an opening for the reception of the hub, an element engaging the disc and arm to secure the latter in place, and a member of arcuate formation in cross section and extending upwardly from the arm to the knife and adapted to divide the dough as it is extruded through said opening, the knife being provided with a beveled lower edge and the member being provided with a beveled lower portion for contact by said edge when the knife is in its lowermost position.

8. The combination in an aliment forming device of the character described comprising a dough hopper with a tubular outlet affording an annular die opening and an intermittently actuated sleeve slidable on the outlet to close the die opening and to sever extrusions of dough; of means movable with the sleeve to shut off a circumferential portion of the die opening and thereby to predetermine formations of crescent configuration.

9. The combination in an aliment forming device of the character described comprising a dough hopper with a tubular outlet affording an annular die opening, and an intermittently actuated sleeve slidable on the outlet to close the die opening and to sever extrusions of dough; and a segmental prolongation on the sleeve to shut off a circumferential portion of the die opening and thereby to predetermine formations of crescent configuration.

In testimony whereof I hereunto affix my signature.

JOHN H. MÜLLER.